United States Patent [19]
Osborn et al.

[11] Patent Number: 5,821,921
[45] Date of Patent: Oct. 13, 1998

[54] CURSOR CONTROLLER HAVING CROSS-TRANSLATING PLATFORMS WITH A CANTILEVERED HANDLE

[76] Inventors: John J. Osborn, 2960 Paradise Dr., Tiburon, Calif. 94920; Robert E. Kraft, 364 Dayton Ave., Santa Clara, Calif. 95051

[21] Appl. No.: 694,538

[22] Filed: Aug. 9, 1996

[51] Int. Cl.$^6$ ............................... G09G 5/08; G09G 9/00
[52] U.S. Cl. ...................... 345/157; 345/160; 345/184; 74/471 XY
[58] Field of Search ................................. 345/156, 157, 345/158, 160, 163, 184; 74/417 XY; 463/38; D14/114; 341/20

[56] References Cited

U.S. PATENT DOCUMENTS

| | | |
|---|---|---|
| D. 340,042 | 10/1993 | Cooper et al. ........................ D14/114 |
| 5,012,230 | 4/1991 | Yasuda ..................................... 345/160 |
| 5,086,296 | 2/1992 | Clark ........................................ 345/157 |
| 5,327,162 | 7/1994 | Soma ................................... 345/156 X |
| 5,446,480 | 8/1995 | Yoshida ................................... 345/157 |
| 5,563,631 | 10/1996 | Masunaga ........................... 345/163 X |

*Primary Examiner*—Steven J. Saras
*Assistant Examiner*—Seith D. Vail
*Attorney, Agent, or Firm*—Flehr Hohbach Test Albritton & Herbert LLP

[57] ABSTRACT

A cursor controller with a handle which moves in X, Y directions has the handle cantilevered on a upper platform which slides on an intermediate platform in an X direction with the axis of the handle intersecting the effective center of X guide means. And then the intermediate platform slides on a Y guide on a lower fixed platform, all of the foregoing being captured by a top cover. The top cover has a slot through which the handle, which is cantilevered on a bracket fixed to the end of the top platform, extends. The controller can be mounted directly on a keyboard or with a specially shaped enclosure to be operated by one hand.

9 Claims, 4 Drawing Sheets

CURSOR CONTROLLER HAVING CROSS-TRANSLATING PLATFORMS WITH A CANTILEVERED HANDLE

The present invention is directed to a cursor controller with a handle and more particularly to where the controller may be keyboard-mounted or hand held.

BACKGROUND OF THE INVENTION

Various types of cursor controllers are known such as mouse devices, joysticks, and controllers having a handle which can be moved in X and Y directions such as shown in Zemke U.S. Pat. No. 4,670,743, and Harris U.S. Pat. No. 5,488,392. If the handle is shaped properly it should feel like and have the action of a pen or pencil It has the added advantage that the user's location on the screen of the display unit is never lost by putting the pencil down. This is the difficulty with a digital tablet which is written on with a stylus.

Ideally an X-Y cursor controller should be very inexpensive, have a minimal of moving parts and these parts must have a very low mass, and the feel of the pencil-like handle should be very natural and offer as little resistance as possible. It should also be usable in many modes. On the other hand from an engineering standpoint the device must be accurate.

OBJECT AND SUMMARY OF INVENTION

It is therefore an object of the present invention to provide an improved cursor controller with a handle.

In accordance with the above object there is provided a cursor controller for use with a computer having a grippable handle movable in orthoganol X axis and Y axis directions including X and Y linear motion detectors to control the movement of a computer generated cursor in response to movement of the handle. A lower fixed base has mounted on it in the Y direction at least one portion of the Y motion detector, and includes one part of a male-female pair of Y interlocking guide means fixed on the top face of the base in an elongated Y direction. An intermediate slab-like platform has mounted on it in the X direction at least one portion of the X motion detector, and has the other part of the Y interlocking guide means on its bottom face and is slidable only in the Y direction on the fixed base for a predetermined Y distance. The intermediate platform has one part of a male-female pair of X interlocking guide means fixed on it top face in an elongated X direction. An upper slab-like platform has the other part of the interlocking guide means on its bottom face and is slidable only in the X direction on the intermediate platform for a predetermined X distance. A rigid cover having a top face and sides securely fits to the sides of the lower fixed base to retain said intermediate and upper platforms in slidable engagement with each other and the fixed base. The top face has a work surface with said X and Y predetermined dimensions. The upper platform includes bracket means having two ends for cantilevering over the top face of the cover from a Y direction extremity of the upper platform to which an end is fixed, the other end carrying the handle. The grippable handle has a Z axis which substantially intersects the effective center of the X interlocking guide means, the handle being freely movable over said work surface by the sliding of the intermediate and upper platforms.

There is also provided a controller with an enclosure which is holdable in one hand and having top and bottom faces. The bottom face has a work area with X and Y directions corresponding to the range of movement of the handle which is mounted on an enclosure for planar movement over the work area. The top or side face has at least one function button operable in conjunction with the cursor. The handle includes a portion adapted to be engaged by the index finger of the hand and positioned on the bottom face to be reachable and engageable by the index finger.

DETAILED DESCRIPTION OF PREFERRED EMBODIMENTS

Figure 1:
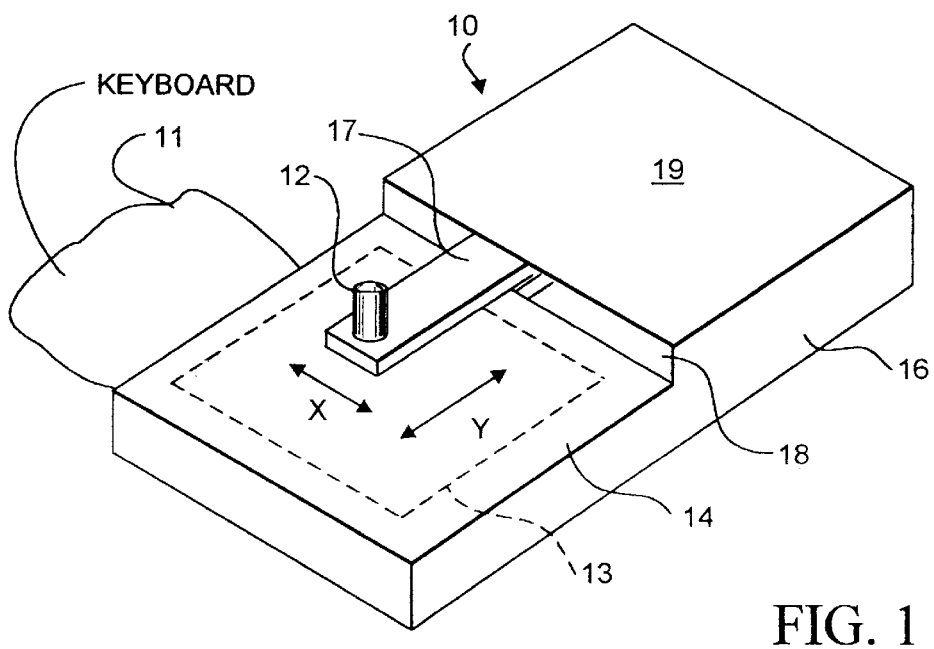
FIG. 1 is a perspective view of a cursor controller embodying the present invention.

FIG. 1 illustrates the cursor controller 10 which may be a stand alone unit or may be part of a keyboard illustrated at 11. The cursor controller is, of course, more accurately termed a pointing device where the pointing is accomplished by the grippable handle or knob 12 which may be moved over a working surface 13 as shown by the dashed rectangle in effective X and Y directions. This working surface is thus equivalent to the video display screen on which the cursor moves. Working surface 13 is part of the top face 14 of the cover 16 of the pointing device. Handle 12 is mounted on a cantilevered bracket 17 which extends through a slot 18 in the stepped portion 19 of cover 16. This slot allows the handle 12 and its cantilevered supporting bracket 17 to freely move over the working surface 13. Thus handle 12 is easily grippable like a pencil by the human hand and movable in effective X and Y directions to control the movement of a computer generated cursor.

Figure 2A:
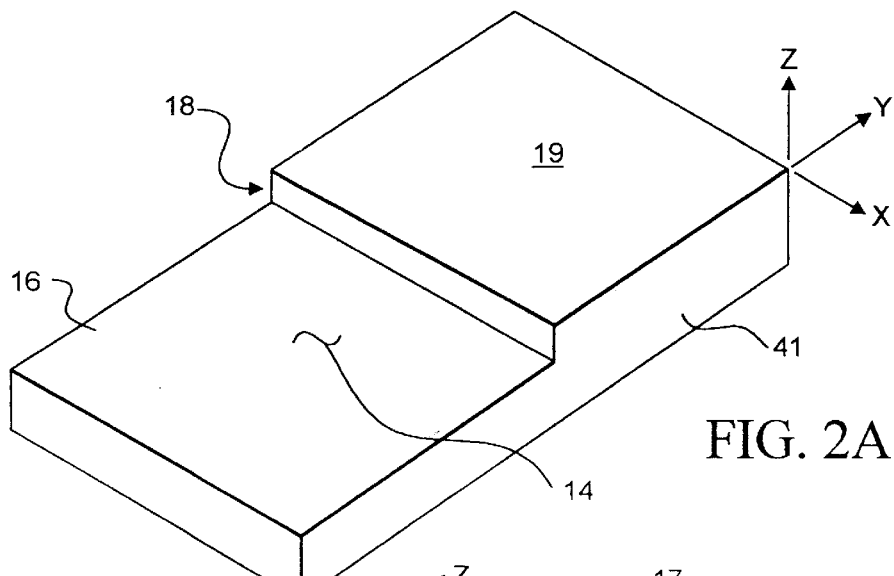
FIGS. 2A through 2D are an exploded perspective view of FIG. 1.
Figure 2B:
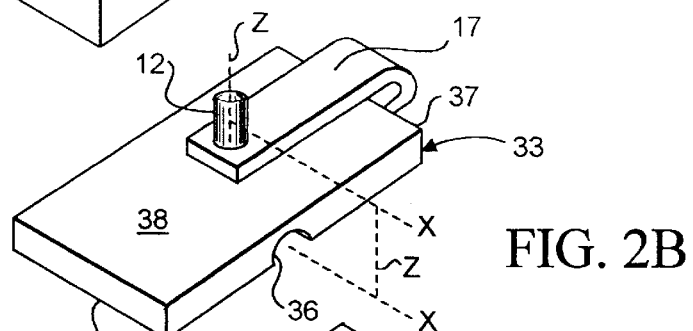
Figure 2C:
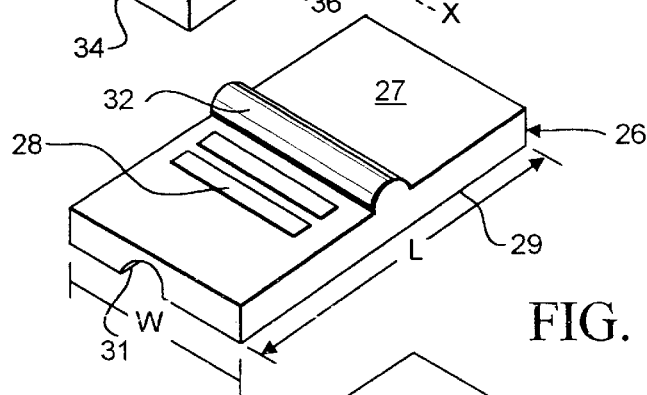
Figure 2D:
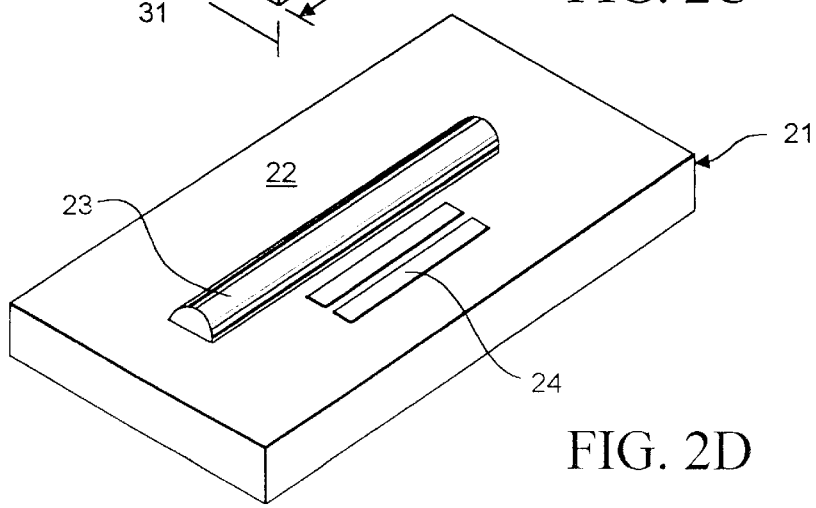

The FIG. 1 exploded is shown in the various FIGS. 2A and 2D. First referring to FIG. 2D, there is a fixed lower base 21 on which is mounted in a Y direction (see FIG. 2A for the orthogonal directions X, Y and Z), on its top face 22 a half-round elongated guide 23. Adjacent to the guide are a pair of resistive strips 24 over which a shorting unit slides to provide an accurate Y direction motion detector. This is well known in the art. FIG. 2C illustrates an intermediate slab-like platform 26 having a top face 27 on which is mounted a pair of resistive stripes 28 which serve as an X motion detector in the same way as the Y detector 24. On the bottom face 29 of intermediate platform 27 is a half-round indentation or groove 31 which mates with the protuberance 33 to interlock and thus provide for sliding in the Y direction between base 21 and intermediate platform 26. On top face 27 is also another protruding half round 32 which is elongated in the X direction.

Finally as illustrated in FIG. 2B the last of the two moving components of the present invention, there is an upper slab-like platform 33 and having on its bottom face 34 a half-round indentation 36 which is elongated in the X direction and which when mated with the protruding half-round 32 will allow upper portion 33 to slide intermediate platform 26 in the X direction.

Figure 4A:
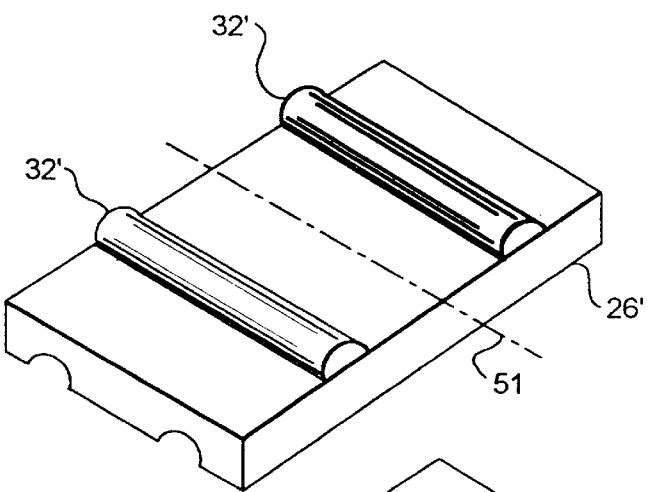
FIGS. 4A and 4B are an exploded view of an alternative embodiment related to FIGS. 2C and 2D.

Upper platform 33 also has attached to its Y extremity end 37, the bracket 17 which extends or is cantilevered over the top face 38 of platform 33 to place the handle 12 substantially over the center of the groove or half-round 36 (or midway between the grooves if there are two; see FIG. 4A). This is illustrated by the dashed lines showing the appropriate X and Z axes. Thus the half-rounds 32 and 36 of FIGS. 2C and 2B form interlocking Y direction guide means which are of the male-female type and similarly with respect to FIGS. 2D and 2C the components 33 and 31 form a similar interlocking pair. Half-rounds are shown but V-shaped configurations are also useable. What is important is that the interlocking guide means are in effect self-centering. In addition these guide means should also have very low friction and the total moving parts should have low inertia.

The foregoing is accomplished by constructing the components of FIGS. 2B, 2C, the movable components, and in addition, of course, the fixed base 2D, of molded or extruded plastic which has a very low friction. Because of the molding process the half-round guides may be formed integrally with the slab-like platforms. This makes a very lightweight and simple construction which is immune to environmental conditions such as heat and dirt, and also from mechanical failure.

Lastly to complete the construction of the cursor controller, the cover 16 of FIG. 2A with its side walls 41 is securely fitted over the sides of the lower fixed base 21 to retain all of the slidable components 26 and 33 of FIGS. 2C and 2B together in slidable engagement with each other. In other words, these two slidable stages 26 and 33 are captured between the cover 16 and the base 21. Cover 16 also limits the motion of handle 12 to determine X and Y distances.

To sense the motion of the sliding units in conjunction with the resistor strips 24 and 28 of FIGS. 2C and 2D, the upper sliding units opposite those strips would include a simple shorting bridge which might be a simple metal strip on the bottom face respectively of unit 26 of FIG. 2C and unit 33 of FIG. 2B. Sensing may also be done by optical pulsing using strips of film with multiple lines and spaces.

Figure 3:
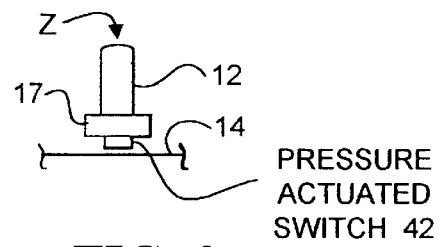
FIG. 3 is a more detailed view of a portion of FIG. 2B.

Since a mouse or cursor controller usually has a push button, FIG. 3 illustrates that implementation where on the bottom of the bracket 17 under the handle 12 is a pressure actuated switch 42 which is in very close proximity to the working surface 13 of the top face 14 (see FIG. 1). Moreover because of the configuration of the bracket 17 it is relatively bendable in the Z direction but because of its width in the X direction is relatively rigid in the X-Y plane.

Another desired feature of the pointer of the present type is that the moving part or handle 12 should be of very low friction so that the fingers will not feel any resistance to the movement of the "pen" and also the moving parts must have a very low mass. The reduction of friction is accomplished, in part as discussed above, by the location of the center of force of movement, that is the Z axis of handle 12, directly over the axis of the groove 36 or over the center between two or more grooves if such are used. Thus movement in the X direction will encounter very little friction. In the case of the Y direction, as illustrated in FIG. 2C, that slider 29 must be longer in the Y direction (L) than wide (W). This is because the force vectors which produce sliding must be large compared to frictional resistance. Thus when the platform 33 is to the extreme left or right of the working surface 13, the skew force or the force tending to bind the groove 31 against the half-round 23 is still minimal. And finally, of course, with the molded plastic construction inertia is low for all moving parts.

Figure 4B:
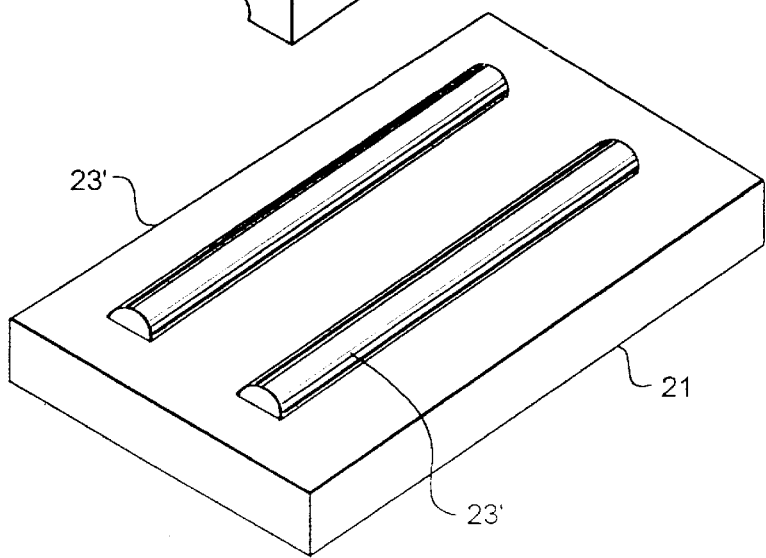

In cases where it is desired to reduce friction even more, the alternative embodiments of FIGS. 4A and 4B may be used. Here intermediate platform 26' has been modified with a pair of half-round sliding guides 32'. These are spaced the same distance from the X center line 51 so that the handle 12 is still located directly above this effective center of the X interlocking guide means. The same is true of FIG. 4B with the modified platform 21' and a pair of guides 23'.

With the preferred construction of the final device illustrated in FIG. 1 it is apparent that the cover 16 besides retaining the movable components also keeps dust and fingers out of the moving mechanism. However if the environmental conditions are good, the stepped portion 19 of the cover could be removed. Of course some arrangement would have to be made to place a stop, for example, at the edge or end of FIG. 4B to retain the moving parts.

Although resistive strips have been shown as motion detectors, optical detection may be alternatively used with a slit pattern where light passes from an emitter to a receptor. And to obtain good resolution, linear multiple stripes can be used so that light can pass through many slots at the same time. To do this photographic film can be used for the slit portion.

Figure 5:
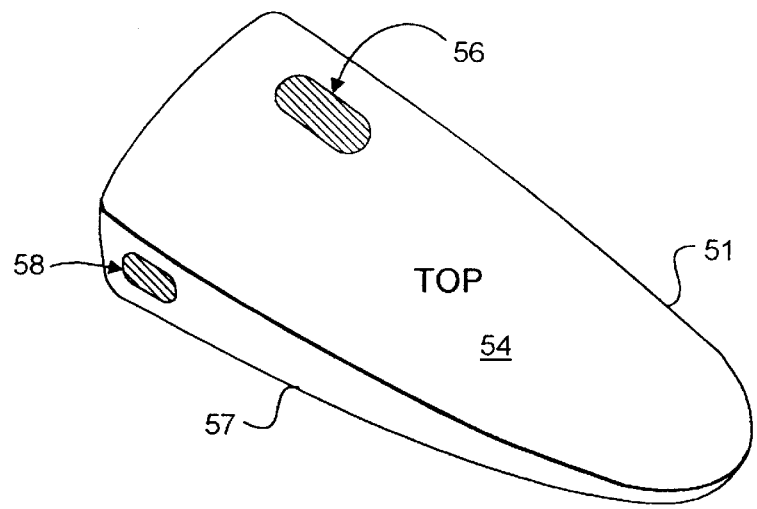
FIGS. 5 and 6 are perspective top and bottom views of an alternative embodiment.
Figure 6:
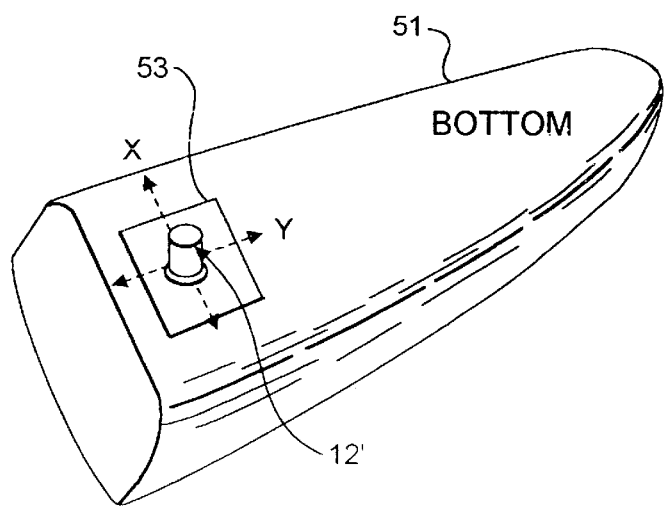
Figure 7:
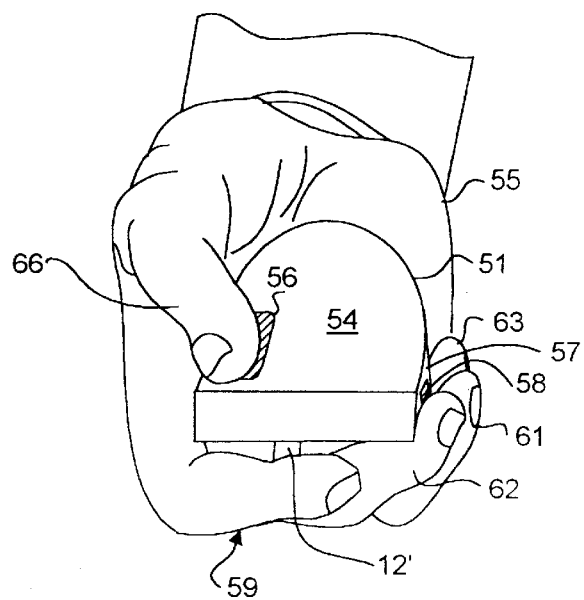
FIG. 7 is a perspective view showing one mode of operation of FIGS. 5 and 6.

FIGS. 5 and 6 show an alternative embodiment of FIG. 1 where the same sliding mechanism is used for the handle 12'. But the entire mechanism shown in FIGS. 2B, 2C and 2D is enclosed in an elongated enclosure 51 where as shown in FIG. 6 on the effective bottom 52 of the enclosure the handle 12' is provided. It is moveable in the X and Y directions indicated within the rectangular aperture or area 53 in the bottom surface 52. The enclosure 51 is elongated along the Y axis (in the direction of the fingers) so that it is conveniently hand held as shown in FIG. 7 where the Y axis is in the direction of the fingers. However, the enclosure can also be held crosswise in the palm of the hand and operated effectively. The hand 55 illustrated is the right hand. As held in this embodiment the top surface 54 is up and the bottom surface 52 is against the palm of the hand 55. Top surface 54 includes a function button 56 and the edge 57 of the enclosure may include a second function button 58.

As illustrated in FIG. 7, button 12' includes a surface portion (perhaps curved or with a friction surface) which is reachable and engageable by the index finger 59. With the enclosure 51 cradled in the right hand 55 the right thumb 66 serves to hold the controller by pressing on top surface 54 and may also actuate and reach the button 56. Finally the remaining three fingers of the hand 61, 62 and 63 will hold the edge 57 and retain the enclosure 51 in the hand. One of these fingers, for example, the middle finger 61 can engage the other function button 58 if that is indeed used. Surface 54 or the enclosure 51 may be covered by other buttons as required. Of course, edge function button 58 may be the only preferred function button depending on the user.

Thus in summary with the use of the handle or pointing device embedded in the bottom surface of the remote controller this offers two advantages over the existing hand held pointing devices that are operated from a top surface. First the entire top surface of the controller is still free for buttons. And secondly the pointing input can be done by using only a single hand.

Figure 8:
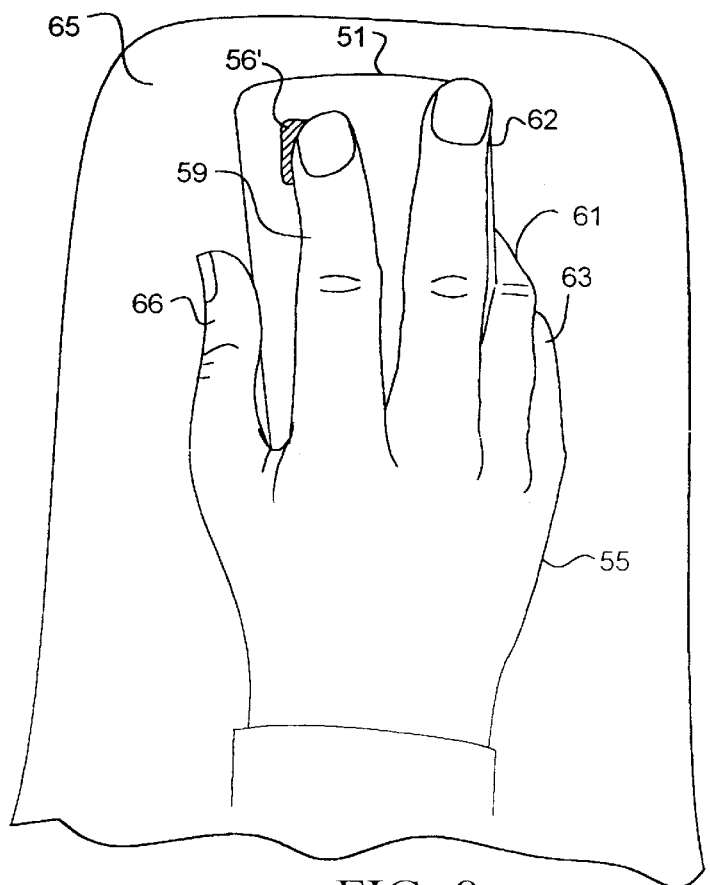
FIG. 8 is a perspective view showing another mode of operation of FIGS. 5 and 6.

FIG. 8 shows an alternative mode of use where the enclosure 51 is still cradled in the right hand 55 but with the handle 12' being engaged with, for example, the knee 65 of the user (or other flat surface). Here the enclosure 51 is held between the thumb 66 and some of the other fingers 61, 62, 63 of the hand. The index finger 59 may actuate the button 56' (which is now located near the opposite edge).

Finally the above concept can be used to integrate a pointing device into the bottom of a portable computer or personal digital assistant or to be used as a remote control device. Thus an improved cursor controller has been provided.

What is claimed is:

1. A cursor controller for use with a computer having a grippable handle movable in X axis and Y axis directions, which are orthogonal including X and Y linear motion detectors to control the movement of a computer generated cursor in response to movement of the handle comprising:

a lower fixed base on which is mounted in the Y direction at least one portion of said Y motion detector, and including one part of a male-female pair of Y interlocking guide means fixed on the top face of said base in an elongated Y direction;

an intermediate slab-like platform, on which is mounted in the X direction at least one portion of said X motion detector, and having the other part of said Y interlocking guide means on its bottom face and slidable only in the Y direction on said fixed base for a predetermined Y distance, said intermediate platform having one part of a male-female pair of X interlocking guide means fixed on its top face in an elongated X direction;

an upper slab-like platform having the other part of said X interlocking guide means on its bottom face and slidable only in the X direction on said intermediate platform for a predetermined X distance;

a rigid cover having a top face and sides which securely fit to the sides of said lower fixed base to retain said intermediate and upper platforms in slidable engagement with each other and said fixed base, said top face having a work surface with said X and Y predetermined dimensions;

said upper platform including bracket means, having two ends, for cantilevering over the top face of said cover from a Y direction extremity of said upper platform, to which a said end is fixed, the other said end carrying said handle, said grippable handle having a Z axis which substantially intersects the effective center of said X interlocking guide means, said handle being freely movable over said work surface by the sliding of said intermediate and upper platforms.

2. A cursor controller as in claim 1 where said cover extends over all of said lower fixed base and includes an X oriented slot for receiving and allowing movement of said bracket and handle over said work surface.

3. A cursor controller as in claim 2 where said slot divides said cover between said work surface and a stepped portion to allow free movement of said bracket.

4. A cursor controller as in claim 1 where said handle includes a pressure switch in close proximity to said work surface.

5. A cursor controller as in claim 1 where said guide means consist of half-round male-female interlocking components which are self-centering.

6. A cursor controller as in claim 1 where said bracket means is relatively rigid in the X-Y plane compared to the Z direction.

7. A cursor controller as in claim 1 where said intermediate platform has a Y axis length substantially greater than its X axis width whereby sliding friction in the Y direction is reduced.

8. A cursor controller as in claim 1 where said platforms are molded from low friction plastic.

9. A cursor controller as in claim 1 where said rigid cover forms a part of an enclosure which is holdable in one hand and elongated in one direction and having top and bottom faces and side edge, said bottom face having a work area with X and Y directions corresponding to the range of movement of said handle which is mounted on said enclosure for planar movement over said work area;

said top face or edge having at least one function button operable in conjunction with said cursor;

said handle including a portion adapted to be engaged by the index finger of said hand and positioned on said bottom face to be reachable and engageable by such index finger.

\* \* \* \* \*